April 18, 1961
R. E. MILLER
2,980,439
RESILIENT SUSPENSION SYSTEM AND STRESS
ABSORBING UNITS THEREFOR
Filed July 17, 1958
5 Sheets-Sheet 4
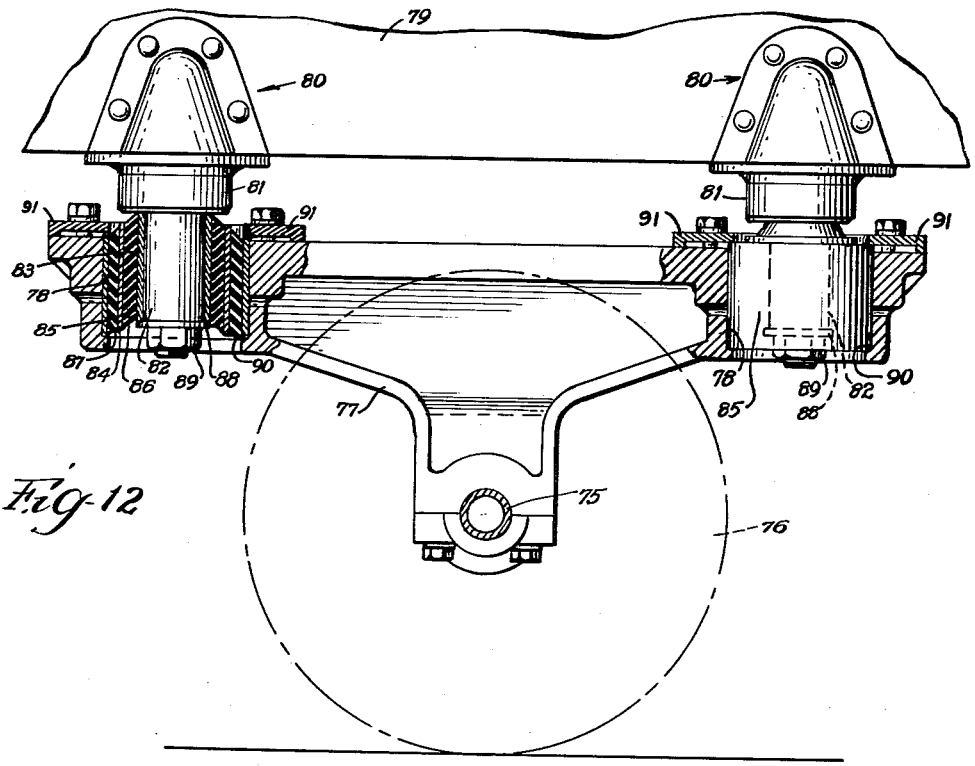
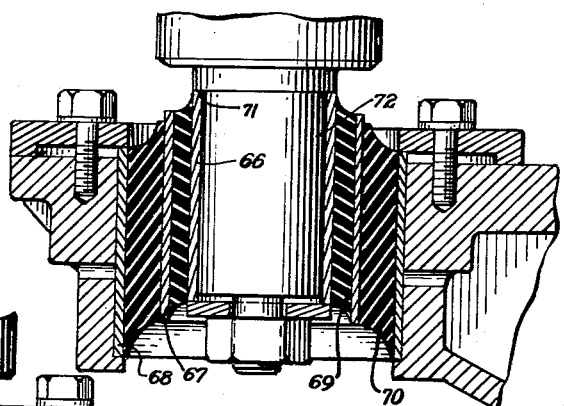
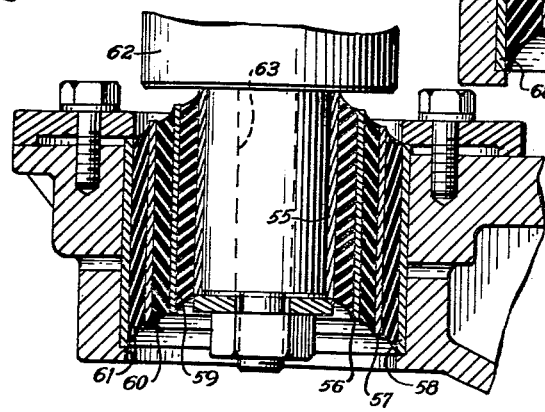
INVENTOR.
R. Earl Miller
BY
Cromwell, Greist & Warden
Attys.

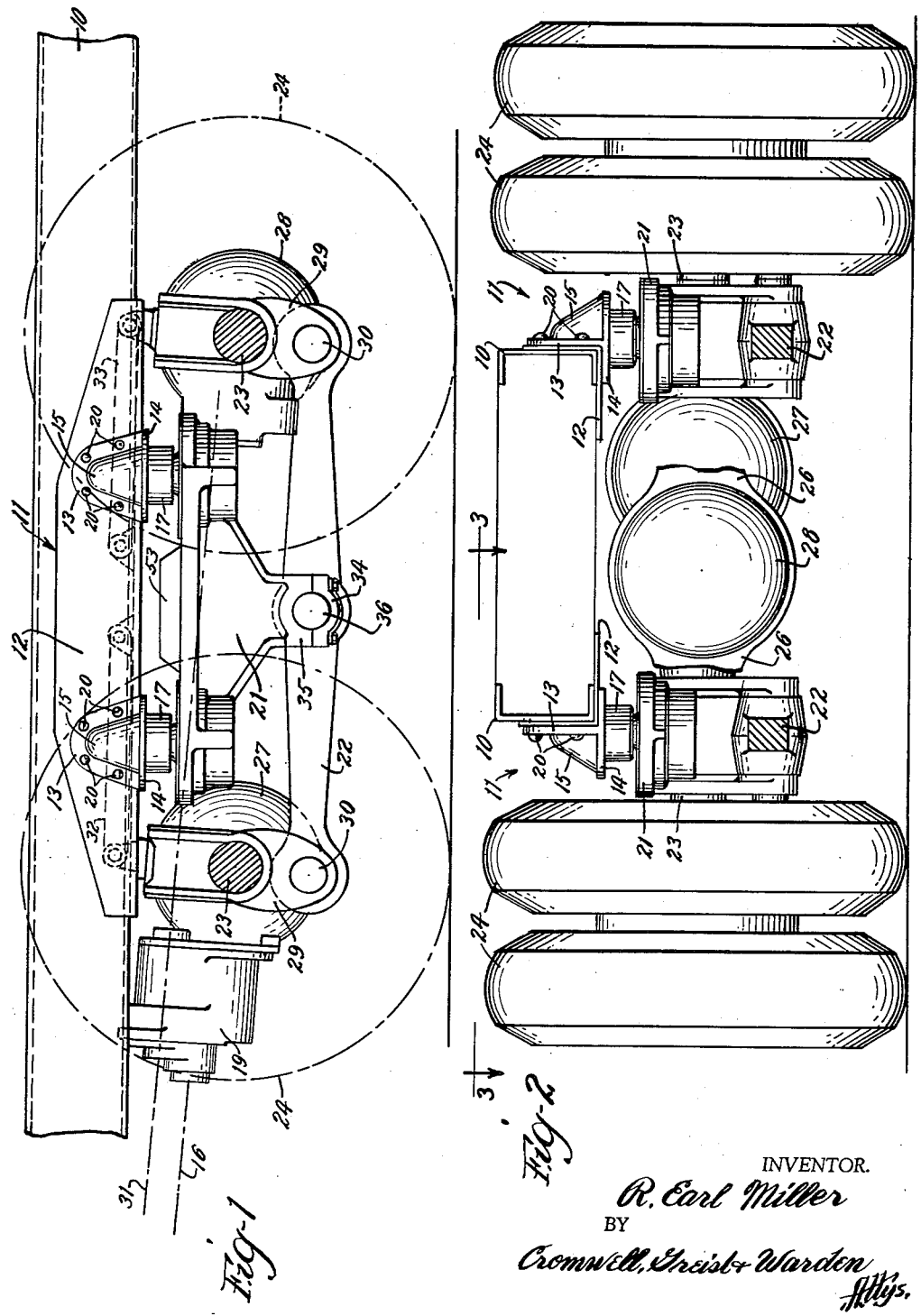

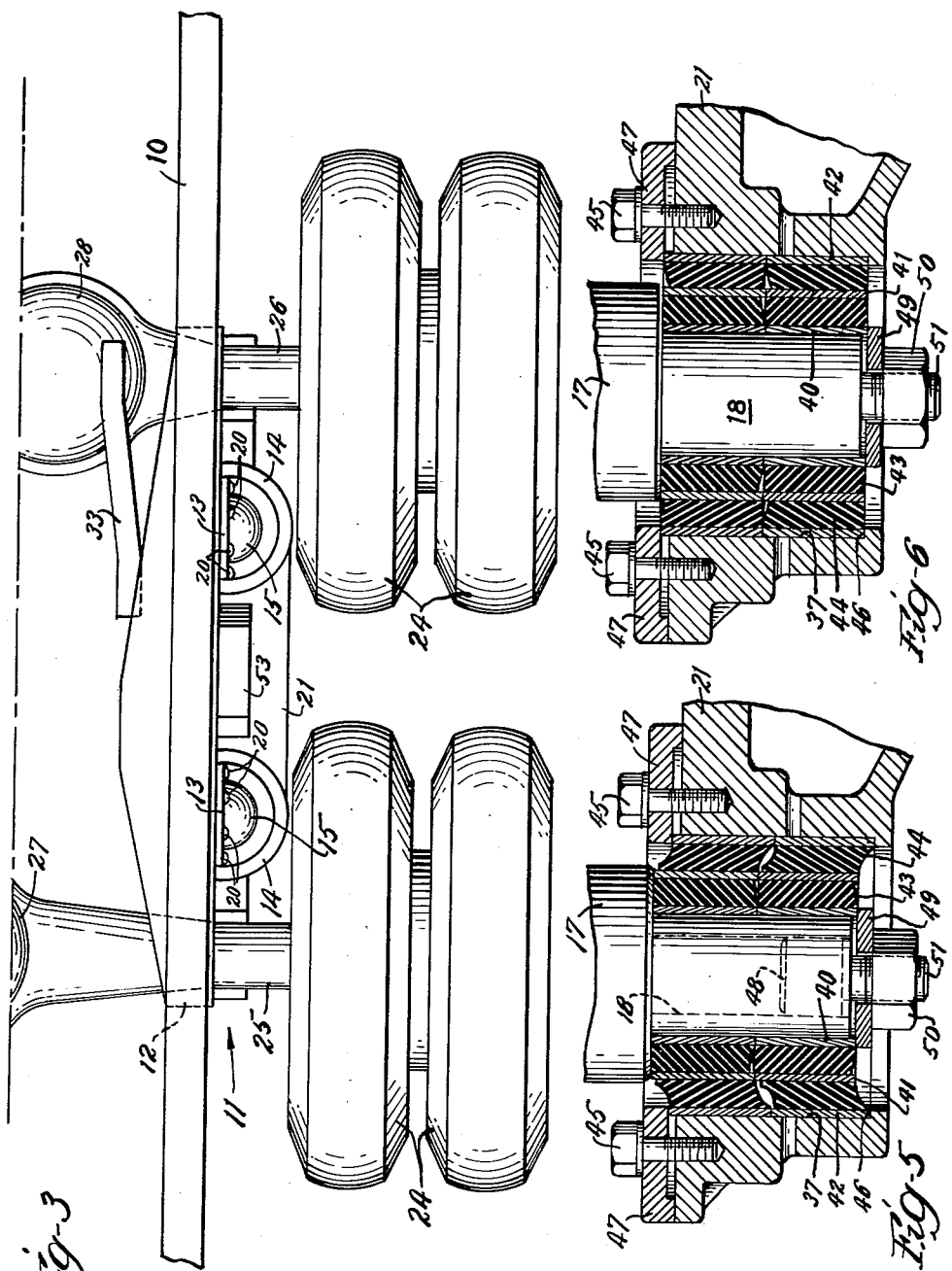

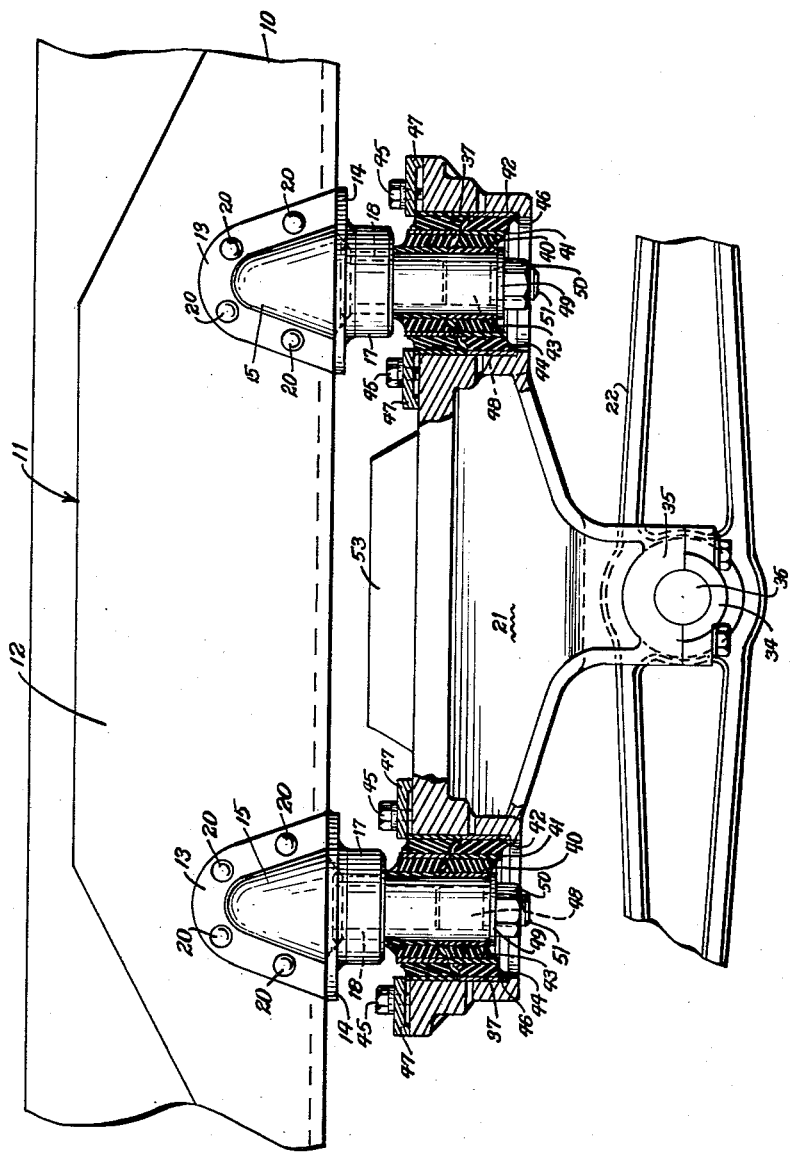

April 18, 1961
R. E. MILLER
RESILIENT SUSPENSION SYSTEM AND STRESS
ABSORBING UNITS THEREFOR
Filed July 17, 1958
2,980,439
5 Sheets-Sheet 5
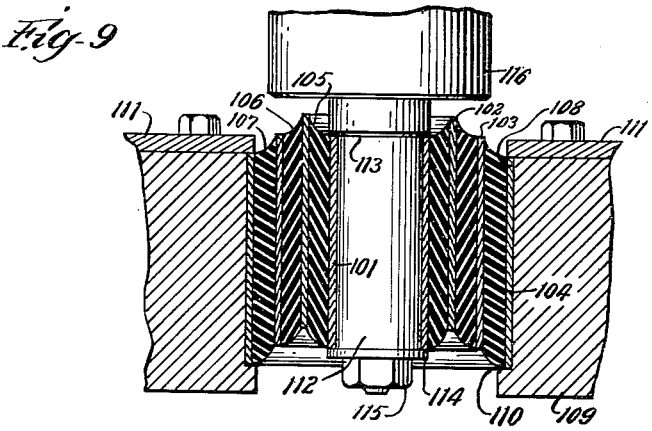
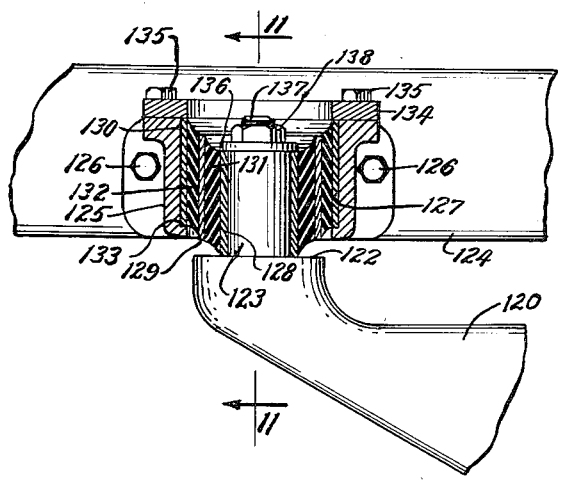
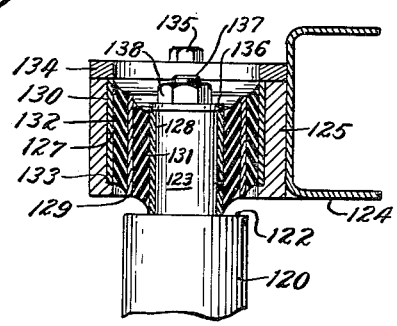
INVENTOR.
R. Earl Miller
BY
Cromwell, Greist & Warden
Attys.

2,980,439

RESILIENT SUSPENSION SYSTEM AND STRESS ABSORBING UNITS THEREFOR

R. Earl Miller, Butler, Ind., assignor to Hendrickson Mfg. Co., Lyons, Ill., a corporation of Illinois Filed July 17, 1958, Ser. No. 749,122

6 Claims. (Cl. 280—104.5)

This invention relates, generally, to certain innovations and improvements in suspension systems for vehicles wherein rubber or a rubber-like material is used, instead of steel or metallic springs, to provide a resilient suspension of the frame from the axles. Axle suspension systems for vehicles, using resilient mountings, have been previously disclosed as in Peterman Patents 2,318,257 and 2,360,619 and Hendrickson Patent 2,689,136.

An important object of the invention is an improved suspension system for resiliently mounting or supporting a vehicle frame on either single or tandem axles, wherein both vertical load stresses and horizontal stresses, such as starting, turning and braking stresses, are absorbed by suspension units each comprising a plurality of concentrically and alternately arranged rigid and resilient sleeve members, a pair of such units being interposed between each side of the frame and the adjacent axle support means therefor and spaced in a front and rear relationship to the longitudinal center of the axle support means.

A more detailed object of the invention is to provide a resilient suspension of the character described wherein each unit comprises at least three concentric rigid sleeves and at least two resilient sleeves disposed between and bonded to adjacent rigid sleeves in a manner such that normally the ends of the rigid sleeves are disposed in a vertically stepped arrangement, preferably downwardly from the inner rigid sleeve to the outer rigid sleeve, and wherein preferably the outer rigid sleeves are adapted to be securely mounted on the axle support means and the inner sleeves are adapted to be securely fitted on pins depending from the frame of the vehicle whereby the innermost resilient sleeves provide the primary resilient support for the frame when lightly loaded and the outer resilient sleeves provide additional resilient support for the frame as it is more heavily loaded and rigid portions of the frame about against the upper ends of the intermediate rigid sleeves.

Another important object of the invention is to provide an improved springless suspension of the character described for the wheel-and-axle assemblies of trucks and trailers wherein sleeve components formed of rubber or rubber-like material are used and relied on to resiliently support and connect the vehicle frames on and to single or multiple wheel-and-axle assemblies so as to support and absorb both the vertical and horizontal stresses without frictional engagement of hard surfaces between which wear can take place, and wherein positive connections are provided between the vehicle frames and the wheel-and-axle assemblies.

Another important object of the invention is to provide a new and improved resilient suspension of the character described utilizing components formed of rubber or rubber-like material which are relatively simple to produce and install, which are economical as to initial cost, which require no lubrication, and which are relatively long lasting but readily replaceable when necessary at less cost than would be involved in the replacement of a leaf-spring type suspension.

A still further object of the invention is to provide a new and improved resilient suspension unit adapted to absorb both vertical and horizontal stresses and being fabricated of a plurality of resilient sleeves arranged concentrically and having their inner and outer surfaces bonded to a plurality of concentrically and alternately arranged rigid sleeves in a manner such that normally the ends of the rigid sleeves are disposed in a vertically stepped arrangement.

Certain other objects of the invention will, in part, be obvious and will, in part, appear hereinafter.

For a more complete understanding of the nature and scope of the invention, reference may now be had to the following detailed description thereof taken in connection with the accompanying drawings wherein:

Fig. 1 is a side elevational view partly broken away showing one side of a tandem rear axle suspension unit embodying the invention, for a truck or tractor unit;

Fig. 2 is a rear elevational view partly in section of the unit shown in Fig. 1, certain parts being omitted or broken away in order to show the construction of the resilient suspension;

Fig. 3 is a fragmentary top plan view showing one-half of the unit of Fig. 1 and taken generally on the line 3—3 of Fig. 2;

Fig. 4 is a fragmentary side elevational view on enlarged scale and partly in vertical section of the resilient suspension between the frame and the side beam saddle as shown in Fig. 1 and showing the suspension units when the vehicle is either not loaded or very lightly loaded;

Fig. 5 is a vertical sectional view on enlarged scale of the left-hand suspension unit shown in Fig. 4 when the vehicle is intermediately loaded;

Fig. 6 is a vertical sectional view similar to Fig. 5 of the left-hand suspension unit shown in Fig. 4 when the vehicle is heavily loaded;

Fig. 7 is a vertical sectional view of a modified form of the suspension unit having four rigid sleeve members and three resilient sleeve members and showing the unit when lightly loaded;

Fig. 8 is a vertical sectional view of another modification of the suspension unit wherein the outer resilient sleeve is of a greater thickness than the inner resilient sleeve and showing the unit when lightly loaded;

Fig. 9 is a vertical sectional view of yet another modified form of the suspension unit showing another arrangement of rigid and resilient sleeves and showing the unit when lightly loaded;

Fig. 10 is a fragmentary vertical sectional view, showing a second embodiment of the invention wherein the resilient suspension units are mounted between upstanding pins carried on the saddles and bore means associated with the vehicle frame;

Fig. 11 is a vertical sectional view taken generally on line 11—11 of Fig. 10; and Fig. 12 is a side elevational view, partly in vertical section, showing a third embodiment of the invention in the form of a resilient axle suspension interposed between the housing of a single axle and a vehicle frame.

Referring to Figs. 1 to 4 inclusive of the drawings, the frame of the vehicle may typically include a pair of longitudinal channel beams 10—10 on the opposite sides of which bracket fixtures, indicated generally at 11—11, are attached. Each bracket 11 is fabricated from components comprising an angle member 12 which fits the adjacent channel 10 as shown and a pair of fixtures riveted thereto. Each fixture includes a vertical portion 13 disposed against the vertical portion of the angle member 12, a flat disc portion 14 at the lower end thereof disposed partially up against the horizontal portion of the angle member 12 and partially extending outwardly away from the portion 13, and an outwardly curved strengthening portion 15 secured between the vertical portion 13 and the outwardly projecting portion of the disc portion 14. A relatively thick disc-like socket member 17 is centrally located and secured against the underside of the flat disc portion 14. Each of the socket members 17 is centrally apertured so as to receive a pin 18 (tubular in the embodiment shown) which is secured in the aperture, as by welding, so as to extend downwardly from the socket member 17. Each of the brackets 11 as above described may be fabricated by welding the various parts together. Rivets 20—20 may be used to attach the bracket fixtures 11 to the channel beams 10—10.

Each of the bracket fixtures 11 is located over a saddle designated generally at 21 on which the bracket fixture is resiliently mounted. Each of these saddles 21 is pivotally mounted and supported on the middle of a side or walking beam 22, extending between, and pivotally connected to, the ends of tandem axles 23—23.

A pair of dual wheels 24—24 is mounted on the opposite ends of each of the longitudinally spaced axles 23 in the usual manner, as shown in Figs. 2 and 3. Each of the axles 23 passes through front and rear axle housings indicated at 25—25 and 26—26, respectively. Differential housings 27 and 28 are located between the axle housings 25—25 and 26—26, respectively, and may be integrally formed therewith. The opposite ends of each of the axle housings 25 and 26 are provided with hangers 29—29 (Fig. 1) which are welded thereon, the bottom ends of these hangers being bifurcated and apertured so as to straddle the eyes integrally formed on the opposite ends of each walking beam 22. The ends of the beams 22 are pivotally connected to the respective hangers 29 by the pins 30 extending through the aligned eyes and apertures.

In the particular unit shown in the drawings, each pair of the axles 23 is driven. Power is delivered to the unit by means of a propeller shaft indicated by the line 16 to a gear box 19 attached to the front differential housing 27. The front pair of axles 23 is driven from the gear box 19 through a known differential gear to the unit and power is delivered from the gear box 19 to the rear axles 23 by means of a drive shaft indicated by the line 31 which leads into the rear differential housing 28. The housings 27 and 28 are held in the proper angular position by means of torque rods 32 and 33, respectively (Fig. 1). Each of these rods 32 and 33 is pivotally connected between the top of one of the housings 27 and 28, respectively, and the frame.

Each of the saddles 21 is provided with a set of removable bottom bearing halves 34—34, each of which mates with an upper bearing half 35 integrally formed as part of the saddle 21. The mating bearing halves 34 and 35 provide journal bearings on the opposite side of each saddle 21 by which the saddle is pivotally mounted on the opposite ends of a shaft 36 passing through the middle of each of the beams 22 and extending across the unit so that the one shaft 36 serves both walking beams 22. The top of each of the saddles 21 is provided with a flat elongated surface which extends underneath each of the adjacent bracket fixtures 11 including the socket members 17 forming portions thereof. Each end of the saddles 21 is provided with a vertically extending through bore or integral sleeve portion 37 (Fig. 4) each of which is axially aligned with one of the tubular pins 18. The bores 37 are substantially larger in diameter than the pins 18 which are long enough so as to project downwardly through each of the bores 37 as shown.

As stated above, an important object of the invention is to resiliently mount the vehicle frame including the side beams 10—10 onto the saddles 21 and the side beams 22—22 without using conventional leaf springs or the like, and in such a manner that there is no wear encountered by virture of one part formed of metal or other material frictionally engaging and wearing against another part formed of hard material. In this connection there are two principal types of load or stress involved in such a mounting which must be absorbed and provided for in order to resiliently mount the vehicle frame on the tandem axles. One of these loads is primarily composed of vertical stresses (e.g., weight of frame and load) and the other is primarily composed of horizontal stresses (e.g., starting, turning and braking stresses).

To provide means for absorbing both of the above described types of stress, a novel form of resilient suspension unit, best shown in Figs. 4, 5 and 6, is provided for each pin-and-bore combination 18—37. As shown in the drawings (Fig. 4), each of these units is composed of at least three concentrically arranged rigid sleeve members (e.g., an inner rigid sleeve member 40, an intermediate rigid sleeve member 41 and an outer rigid sleeve member 42) and at least two resilient sleeve members formed of rubber or a rubber-like material (e.g., an inner resilient sleeve member 43 disposed between and bonded to the rigid sleeve members 40 and 41 and an outer resilient sleeve member 44 disposed between and bonded to the rigid sleeve members 41 and 42). The manner in which rubber may be permanently united or bonded to metal so as not to separate therefrom, even under high separating forces, is well-known in the art. The outer rigid sleeve members 42 are formed of a size to fit within the bores 37 while the inner rigid sleeve members 40 are formed of a size to fit on the tubular pins 18. The resilient sleeve members 43 and 44 are bonded to the rigid sleeve members 40, 41 and 42 so that normally in each set or series of sleeve members the upper ends of the rigid sleeve members 40, 41 and 42 are disposed at different vertical levels. In the suspension units shown in Figs. 4, 5 and 6 the upper ends of the rigid sleeve members are disposed in a downwardly stepped arrangement from the inner sleeve 40 to the outer sleeve 42.

It is noted that in Figs. 4, 5 and 6 two separate resilient suspension units of the character described are utilized in axial alignment for each pin-and-bore combination 18—37. It is to be understood that a single unit of twice the length could be utilized in place of the two units disposed in endwise alignment. The showing of two endwise aligned units merely illustrates that the resilient suspension units disclosed herein may be fabricated in standard lengths and any number thereof used in endwise alignment for a particular installation. In the following discussion the two endwise aligned units will be treated as a single unit.

The lower end of each of the bores 37 is provided with an inwardly turned shoulder 46 upon which the outer rigid sleeve member 42 is adapted to be supported. Clamping rings 47 are provided on the top flat surface of each saddle 21 and are adapted to be tightened into clamping engagement with the upper ends of the outer rigid sleeve members 42 by means of bolts 45 so as to tightly secure the sleeves 42 in the bores 37. To retain the inner rigid sleeve members 40 on the tubular pins 18 with the upper ends thereof in engagement with the lower surfaces of the socket members 17, plug members 48 are threaded into the lower ends of the tubular pins 18 (Fig. 4) so that reduced threaded portions 51 thereof extend below the tubular pins 18. A washer 49 is fitted over each reduced plug portion 51 and is held tightly by means of a nut 50 against the lower end of the inner rigid sleeve member 40 of each unit which is fitted on the pin 18. It is to be understood that a solid pin could be utilized in place of the tubular pin 18 shown in the drawings.

With a pair of these resilient suspension units interposed between each side of the frame and the wheel-and-axle assembly, all of the horizontal stresses developed in driving, such as starting, turning and braking stresses, are absorbed by the concentrically arranged resilient sleeve members 43 and 44 with the pins 18 providing a positive connection between the vehicle frame and the saddles 21 carried on the wheel-and-axle assembly. This arrangement substantially reduces any horizontal resiliency, such as rocking movement of the frame.

The same resilient sleeve members 43 and 44 also absorb the vertical stresses resulting from the weight of the frame and any load carried by the vehicle. Because each outer resilient sleeve member 44 is of a larger diameter than its associated inner resilient sleeve member 43, it provides a greater resistance to the vertical stresses which exert a shearing force on the resilient sleeves. With this arrangement, the inner resilient sleeve members 43 are adapted to provide the primary resilient support for the vehicle frame when lightly loaded and the outer resilient sleeve members 44 are adapted to provide additional resilient support as the frame is more heavily loaded. As the vehicle is loaded both the inner and the outer resilient sleeves 43 and 44 give or become compressed in a vertical direction but the outer sleeve 44 because of its greater resistance to vertical stresses gives at a slower rate than the inner sleeve 43.

In use, when the vehicle (e.g., a large truck) is empty or lightly loaded, corresponding to the condition of the suspension illustrated in Fig. 4, the resilient mounting of the frame is provided primarily by relative vertical movement between the inner rigid sleeve members 40 and the intermediate rigid sleeve members 41, this differential in movement being absorbed by the inner resilient sleeves 43. This resilient action of the lightly loaded frame may best be illustrated by a comparison of Figs. 4 and 5, the latter figure illustrating the condition where the vehicle is intermediately loaded.

It is noted that each socket member 17 is of such a size that the lower end thereof extends over the upper end of the intermediate rigid sleeve member 41 associated therewith. Thus, as the vehicle is more heavily loaded, the inner resilient sleeve members 43 become fully stressed and the frame descends until the socket members 17 abut against the upper ends of the intermediate sleeve members 41, as shown in Fig. 5. Thereafter, the resilient mounting of the more heavily loaded frame results generally from relative vertical movement between the intermediate rigid sleeve members 41 and the fixedly mounted outer rigid sleeve members 42 through stressing of the outer resilient sleeve members 44, as may best be illustrated by a comparison of Figs. 5 and 6, the latter figure corresponding to the condition of heavy loading.

If desirable as a safety precaution, a shock pad 53, Figs. 1, 3 and 4, may be provided between each side of the vehicle frame and each saddle 21. These pads 53 become functional only upon the failure of one or more of the resilient suspension units.

It has been found that the resilient suspension disclosed herein will provide an effective and suitable resilient mounting for a vehicle having an approximate maximum load to no-load ratio of 10:1, for example. It should be pointed out that the resilient suspension unit disclosed herein must be fabricated from at least two concentrically arranged (i.e., inner and outer) resilient sleeve members bonded to opposite sides of a rigid sleeve member to achieve the desired resilient suspension action.

It is to be understood that other modifications of the suspension unit may be provided within the scope of the invention. Examples of three such modifications are shown in Figs. 7, 8 and 9. In Fig. 7, the resilient suspension unit comprises a series of four rigid sleeve members 55, 56, 57 and 58 and three resilient sleeve members 59, 60 and 61 disposed between and bonded to adjacent pairs of the concentrically arranged rigid sleeve members. In this modification, a socket member 62, which forms a rigid portion of the vehicle frame and in which is secured a pin 63, is adapted to first abut against the upper end of the rigid sleeve 56 and then against the upper end of the rigid sleeve 57 as the load on the vehicle frame is increased, whereby the resilient sleeves 59, 60 and 61 are progressively effective to resiliently support the frame, starting with the innermost one 59.

In the modification shown in Fig. 8, the suspension unit comprises three rigid sleeve members 66, 67 and 68 and two resilient sleeve members 69 and 70 disposed between and bonded thereto. However, the outermost resilient sleeve member 70 is formed with a thickness substantially greater than the thickness of the inner resilient sleeve member 69 so that the sleeve member 70 provides substantially greater resistance to vertical stresses exerted thereon by a heavily loaded frame. Also shown in the modification of Fig. 8 is the abutment of the upper end of the inner rigid sleeve member 66 against a shoulder 71 defined by an enlarged upper portion of a tubular pin 72 upon which the inner sleeve 66 is mounted. It should be noted at this point that the inner resilient sleeve member could be formed with a thickness substantially greater than the thickness of the outer resilient sleeve member to provide an effective resilient mounting for a particular type load situation.

The resistance-to-vertical-stress characteristics of each resilient sleeve member varies with the thickness or volume thereof, the diameter thereof, and the density of the material thereof. By carefully choosing the above variables, one skilled in the art may provide a resilient suspension unit suitable for substantially any load situation that might arise.

The arrangement of the sleeve members may also be varied, as is illustrated in the modification of the resilient suspension unit shown in Fig. 9. In this modification the unit comprises four rigid sleeve members 101, 102, 103 and 104 and three resilient sleeve members 105, 106 and 107. These sleeve members are bonded together so that normally the upper ends of the rigid sleeve members 101 and 103 are disposed at the same vertical level with the rigid sleeve 102 disposed therebetween having its upper end disposed at a higher vertical level and the outermost rigid sleeve 104 having its upper end disposed at a lower vertical level. The outer rigid sleeve is fitted in a bore 108 formed in one end of a saddle 109 and secured against a shoulder 110 formed therein by clamping members 111. The inner rigid sleeve 101 is fitted on a solid pin 112 depending from the vehicle frame and has its upper end held in abutting engagement against a shoulder 113 defined by an enlarged portion of the pin 112 by means of a washer 114 engageable with the lower end of the sleeve 101 and a nut 115 tightened on a reduced threaded end of the pin 112. A rigid portion 116 of the vehicle frame overlies the upper ends of the rigid sleeves 102 and 103 so as to successively abut against them as the load on the vehicle is increased, the resilient sleeve members providing an effective resilient mounting for the vehicle frame whether lightly or heavily loaded.

Another embodiment of the invention is shown in Figs. 10 and 11. In this embodiment, each end of a saddle 120 is formed with a raised portion having a flat upper surface 122. A vertically extending pin 123 is centrally disposed on the surface 122 and rigidly attached thereto by any suitable method. A housing fixture 125 having a vertical bore or sleeve portion 127 is provided for each of the saddle pins 123. Each housing fixture 125 is adapted to be rigidly attached to the frame of the vehicle, represented by a channel beam 124, by suitable means, such as bolts 126, so that its associated pin 123 extends upwardly through the bore 127 in axial alignment therewith. It is noted that the diameter of each pin 123 is substantially less than the diameter of its associated bore 127.

As described with regard to the embodiment of the invention shown in Figs. 1 to 6 inclusive, the vehicle frame is resiliently mounted on the saddle 120 by means of resilient suspension units disposed therebetween. The units shown in Figs. 10 and 11 comprise three rigid sleeve members 128, 129 and 130 arranged concentrically and two resilient sleeve members 131 and 132 disposed therebetween and bonded thereto in a manner such that normally the lower ends of the rigid sleeve members 128, 129 and 130 are disposed in a vertically stepped arrangement upwardly from the inner rigid sleeve 128 to the outer rigid sleeve 130.

The outer rigid sleeve 130 is of a size to fit within the bore 127 and is adapted to be supported on an inwardly turned shoulder 133 formed at the lower end of the bore 127. A clamping ring 134 engageable with the upper end of the outer rigid sleeve 130 is provided to retain the sleeve 130 in the bore 127. Bolts 135 are provided to tighten the clamping ring 134 to the housing fixture 125. The inner rigid sleeve 128 is adapted to fit over the pin 123 with its lower end in abutting engagement with the flat surface 122 on the end of the saddle 120. To retain the inner rigid sleeve 128 on the pin 123, a washer 136 is fitted over a reduced threaded end portion 137 of the pin 123 and is held in abutting engagement with the upper end of the inner rigid sleeve 128 by means of a nut 138 tightened onto the reduced end 137 of the pin 123.

As the vehicle is loaded, assuming the inner resilient sleeve 131 to be less resistant to vertical stresses than the outer resilient sleeve 132, the vertical stresses will initially be absorbed primarily by the inner resilient sleeve 131 until the vehicle is so heavily loaded that the lower end of the intermediate rigid sleeve 129 abuts against the flat surface 122 of the saddle 120 whereby the additional vertical stresses will be substantially absorbed by the outer resilient sleeve 132. This action is substantially the same as that described herein with regard to the embodiment of the invention shown in Figs. 1 to 6 inclusive.

Referring to Fig. 12 of the drawings another embodiment of the invention is shown which is used to support a vehicle frame or body on a single axle. In this embodiment the resilient suspension unit is interposed between an axle housing 75 and the vehicle frame. A pair of dual wheels 76—76 are mounted on the outer end of the axle in accordance with the usual and known construction. A rigid fixture 77 is rigidly secured to the axle housing 75 and has an elongated flat upper surface which extends longitudinally of the vehicle frame and crosswise to the axle housing 75. A vertically extending bore 78 is formed in each end of the fixture 77 corresponding to the bores 37 of the embodiment of the invention described above in connection with Figs. 1 to 8 inclusive. A beam 79 representing the vehicle frame in this embodiment is provided with a pair of fixtures indicated generally at 80 and corresponding to the fixtures described in connection with the embodiment of Figs. 1 to 8 inclusive and including socket members 81 in which are secured pins 82 which extend downwardly through the bores 78 in axial alignment therewith. Resilient suspension units similar to the ones previously described herein and each including three rigid sleeve members 83, 84 and 85 arranged concentrically and having two resilient sleeve members 86 and 87 disposed therebetween and bonded thereto have the inner rigid sleeves 83 fitted on the pins 82 and secured thereto by means of washers 88 and nuts 89 and the outer rigid sleeves 85 securely mounted in the bores 78 by means of shoulders 90 and clamps 91.

In use, the resilient suspension units of the embodiment of Fig. 12 absorb both the vertical and horizontal stresses in the same manner as has been described herein in connection with the embodiment shown in Figs. 1 to 8 inclusive.

It will be seen that the vertical stresses resulting from the weight of the frame and the load on the vehicle and the horizontal stresses encountered during travel of the vehicle such as when it accelerates, passes around curves, rides along at an angle on a crowned road, or is braked suddenly, are supported and absorbed by the resilient mounting arrangements shown and described without there being any interengagement or friction between hard surfaces. Thus there is nothing to wear out in the resilient mounting structure and lubrication is not required.

It will be understood that certain changes may be made in the construction or arrangement of the resilient suspension systems and stress absorbing units therefor disclosed herein without departing from the spirit and scope of the invention as defined in the appended claims.

I claim:

1. A resilient axle suspension adapted to be interposed between each side of a vehicle frame and axle support means therefor, comprising, a pair of pins secured to and depending from the underside of the vehicle frame in front and rear spaced relationship on opposite sides of the center of the axle support means, the vehicle frame being provided with rigid socket portions depending from the underside thereof adjacent each of said pins, means defining a pair of vertically extending bores in the axle support means, each of said bores being disposed concentrically with respect to one of said depending pins and having a diameter substantially greater than the diameter of its associated pin, two series of at least three concentrically arranged, rigid sleeve members, resilient sleeve members formed of a rubber-like material disposed between and bonded to each pair of adjacent rigid sleeves in each series in a manner such that normally the upper ends of the rigid sleeves are disposed in a downwardly stepped arrangement from the inner sleeves to the outer sleeves, each of said inner rigid sleeves being adapted to fit over one of said pins with its upper end in abutting engagement with the rigid depending socket portions of the frame which extends only over the upper ends of the rigid sleeves intermediate said inner and outer rigid sleeves of each of said series, means for retaining said inner rigid sleeves on said pins and in abutting engagement with said rigid socket portions of the frame, said outer rigid sleeves being adapted to fit in said bores in the axle support means, and means for retaining said outer rigid sleeves in said bores, whereby said resilient sleeve members are progressively effective, beginning with the innermost ones, to resiliently support the frame when increases in the load on the vehicle cause said rigid socket portions of the frame to engage progressively the step-arranged upper ends of the rigid sleeves intermediate said inner and outer rigid sleeves, beginning with the ones next adjacent to said inner rigid sleeves, said arrangement of parts permitting disposition of the upper edges of said inner and intermediate rigid sleeves below the upper edges of said outer rigid sleeves upon the application of a maximum load on the vehicle.

2. A resilient axle suspension adapted to be interposed between each side of a vehicle frame and axle support means therefor, comprising, a pair of pins secured to and depending from the underside of the vehicle frame in longitudinally spaced, front and rear relationship on opposite sides of the center of the axle support means, means defining a pair of vertically extending bores in the axle support means, each of said bores being disposed concentrically with respect to one of said depending pins and having a diameter substantially greater than the diameter of its associated pin, an inwardly extending annular shoulder disposed at the bottom end of each of said bores, a pair of socket members secured to the underside of the vehicle frame and each fitting around the upper end of one of said pins, two series of at least three concentrically arranged, rigid sleeve members, resilient sleeve members disposed between and bonded to adjacent sleeves of each series in a manner such that normally the upper ends of the rigid sleeve members in each series are disposed in a downwardly stepped arrangement from the inner sleeve to the outer sleeve, said inner rigid sleeve members being adapted to fit over the lower ends of said pins with their upper ends in abutting engagement with the underside of said socket members, means associated with the lower ends of said pins and engageable with the lower ends of said inner rigid sleeve members for retaining said inner sleeve members in abutting engagement with said socket members, said socket members being of a size such that they extend over the upper ends of the intermediate rigid sleeve members but not over the upper ends of the outer rigid sleeve members, said outer rigid sleeve members being adapted to fit in said bores in the axle support means and to be supported therein by said annular shoulders, clamping means associated with the top surface of the axle support means and engageable with the upper ends of said outer rigid sleeve members to retain said outer sleeve members in said bores, whereby the innermost resilient sleeve members provide the primary resilient support for the vehicle frame when lightly loaded and the other resilient sleeve members provide additional resilient support as the load on the frame is increased and said socket members abut against the upper ends of the intermediate rigid sleeve members, and a shock pad carried on said axle support means intermediate said pair of bores formed therein, said shock pad being adapted to be engaged by the vehicle frame in the event of failure of said resilient sleeve members.

3. A resilient axle suspension adapted to be interposed between each side of a vehicle frame and a wheel-and-axle assembly, comprising, a pair of vertically disposed pins, means for rigidly attaching the upper ends of said pins to the vehicle frame in longitudinally spaced relation on opposite sides of the center of the wheel-and-axle assembly, an elongated rigid fixture having vertical bore means at the opposite ends thereof each of which is axially aligned with one of said pins, means for rigidly securing said fixture to the wheel-and-axle assembly, two sets of at least three concentrically arranged, rigid sleeves having resilient sleeves disposed between and bonded to adjacent rigid sleeves in a manner such that normally the upper ends of the rigid sleeves are disposed in a downwardly stepped arrangement from the inner sleeve to the outer sleeve, means for securing each of said outer rigid sleeves in one of said vertical bore means, means for securing each of said inner rigid sleeves on the lower end of one of said pins so as to prevent relative movement therebetween, and a pair of rigid members adapted to be securely attached to the frame each adjacent one of said pins and each adapted to extend over the upper ends of the inner and intermediate rigid sleeves only in one of said sets, whereby the innermost resilient sleeves are adapted to provide the primary resilient support for the frame when lightly loaded and the other resilient sleeves are adapted to provide additional resilient support when the frame is more heavily loaded and said rigid members abut against the upper ends of the intermediate rigid sleeves, the arrangement of said rigid members permitting disposition of the upper edges of said inner and intermediate rigid sleeves below the upper edges of said outer rigid sleeves when a maximum load is carried by the vehicle.

4. A resilient suspension system adapted to be interposed between each side of a vehicle frame and a longitudinally extending saddle supported by a wheel-and-axle assembly, comprising, a pin secured to and extending upwardly from each end of the saddle, a pair of vertically extending bore means formed in rigid portions of the frame, each of said bore means being so positioned that one of said pins extends upwardly therethrough in axial alignment, each of said pins being substantially smaller in diameter than its associated bore, two sets of at least three concentrically arranged, rigid sleeve members, resilient sleeve members formed of a rubber-like material disposed between and bonded to each pair of adjacent rigid sleeves in each set in a manner such that normally the lower ends of the rigid sleeves are disposed in an upwardly stepped arrangement from the inner sleeves to the outer sleeves, each of said inner rigid sleeves being adapted to fit over one of said pins with its lower end in abutting engagement with a rigid portion of the saddle which extends horizontally below the lower ends of the intermediate rigid sleeves of each of said sets but not below the outer rigid sleeves thereof, means for retaining said inner rigid sleeves on said pins, said outer rigid sleeves being adapted to fit in said bores, and means for retaining said outer rigid sleeves in said bores, whereby said resilient sleeve members are generally effective progressively to resiliently support the frame when increases in the load on the vehicle cause the lower ends of the intermediate rigid sleeve members to abut successively against said rigid portions of the saddle.

5. A resilient axle suspension as recited in claim 2 wherein the outer resilient sleeve member in each of said series is substantially thicker than the inner resilient sleeve member thereof whereby to provide greater resistance to vertical stresses when the vehicle frame is heavily loaded.

6. A resilient axle suspension interposed between each side of a vehicle frame and axle-support means therefor, comprising, a pair of rigid pins secured to and depending from the vehicle frame in longitudinally spaced relation on opposite sides of the center of the axle-support means, two series of at least three concentrically arranged, rigid sleeve members having resilient sleeve members disposed between and bonded to adjacent rigid sleeves in a manner such that normally the upper ends of said rigid sleeves in each series are disposed in a downwardly stepped arrangement from the inner sleeve to the outer sleeve, means securely mounting the outer rigid sleeves on the axle-support means, a pair of cylindrical socket members each of which is axially disposed at the upper end of one of said pins, each of said socket members being secured to the underside of the vehicle frame and having an outer circumference which is smaller than the circumference of said outer rigid sleeves and larger than the circumference of the outermost one of the intermediate rigid sleeves whereby said socket members extend over the upper ends of all of the rigid sleeves except said outer ones, means securely mounting said inner rigid sleeves on said pins so that the upper ends thereof abut against said socket members and so that said inner sleeves do not move relative to said pins, whereby the inner resilient sleeves provide the primary resilient mounting for the frame when lightly loaded and the outer resilient sleeves provide the additional resilient mounting for the frame when it is so heavily loaded that said socket members abut successively against the upper ends of the intermediate rigid sleeves starting with the ones nearest said inner rigid sleeves, and a shock pad carried on the axle-support means intermediate said two series of sleeve members for engagement by the vehicle frame in the event of failure of either one or both of said two series of sleeve members.

References Cited in the file of this patent
UNITED STATES PATENTS

| 2,068,279 | Piron | Jan. 19, 1937 |
| 2,126,707 | Schmidt | Aug. 16, 1938 |
| 2,137,543 | Piron | Nov. 22, 1938 |
| 2,739,821 | Hickman | Mar. 27, 1956 |